April 21, 1970 F. BERNSHAUSEN 3,507,101
TREE FRUIT CULTIVATING AND HARVESTING SYSTEM
Filed April 3, 1968 3 Sheets-Sheet 1

INVENTOR
FRITZ BERNSHAUSEN
BY Beall and Jones
ATTORNEYS

April 21, 1970 F. BERNSHAUSEN 3,507,101
TREE FRUIT CULTIVATING AND HARVESTING SYSTEM
Filed April 3, 1968 3 Sheets-Sheet 2
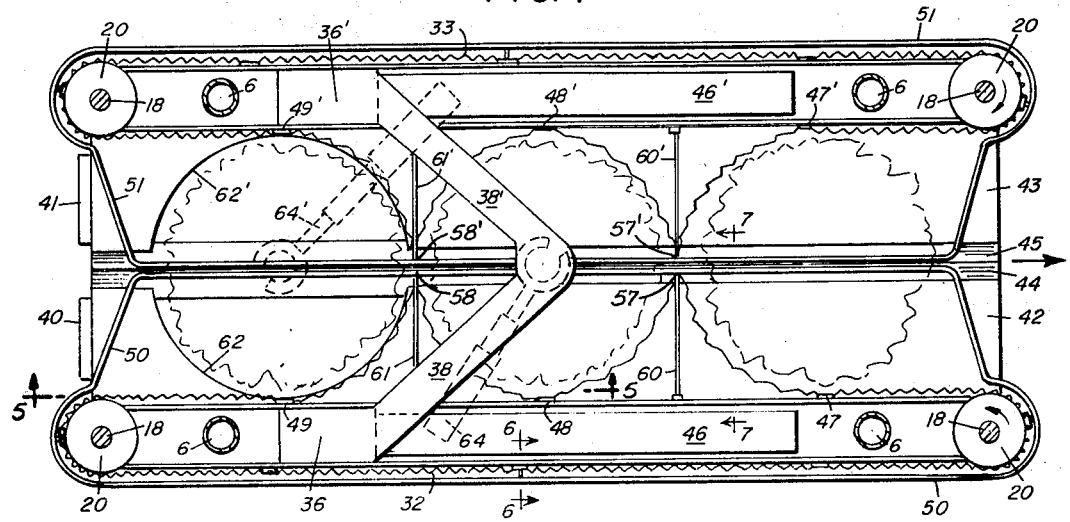
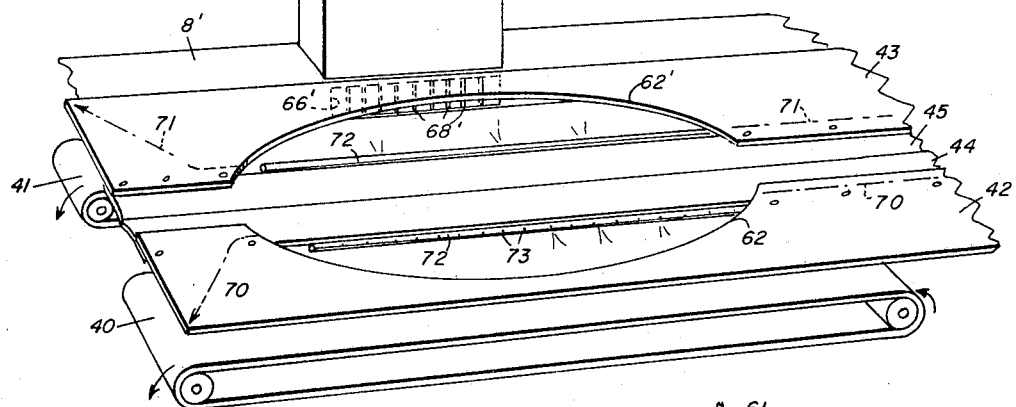
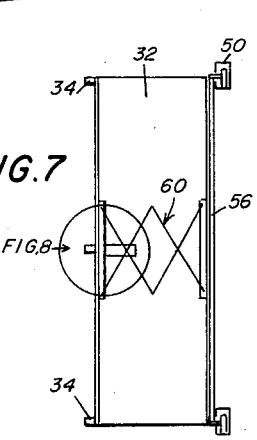
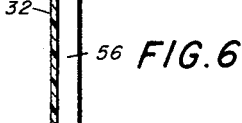
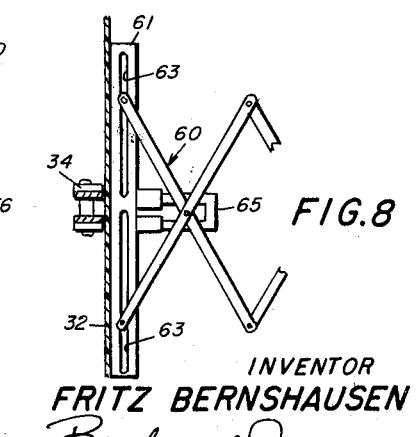
INVENTOR
FRITZ BERNSHAUSEN
BY Beale and Jones
ATTORNEYS April 21, 1970     F. BERNSHAUSEN     3,507,101
TREE FRUIT CULTIVATING AND HARVESTING SYSTEM
Filed April 3, 1968     3 Sheets-Sheet 3

INVENTOR
FRITZ BERNSHAUSEN
BY Beale and Jones
ATTORNEYS

United States Patent Office 3,507,101
Patented Apr. 21, 1970

3,507,101
TREE FRUIT CULTIVATING AND HARVESTING SYSTEM
Fritz Bernshausen, 1109 W. G St.,
Elizabethton, Tenn. 37643
Filed Apr. 3, 1968, Ser. No. 718,552
Int. Cl. A01g 19/08
U.S. Cl. 56—1                                                                6 Claims

ABSTRACT OF THE DISCLOSURE

A multiple purpose machine for cultivating and harvesting fruit trees in an orchard. The machine is constructed to straddle a row of trees, and performs operations on trees interiorly of the machine as the machine continuously moves along a tree row. The basic machine may be equipped for pruning and hedging, spraying or harvesting. For harvesting, individual trees are surrounded by containers formed of extended flexible partitioning, the containers are filled with a cushioning material, the trees are shaken to dislodge the fruit therefrom, and a pneumatic conveying system withdraws the cushioning material from the container, allowing the fruit to gently settle on conveyor belts without bruise producing impacts. The cushioning material withdrawn from one container is deposited into a second container formed about a second tree, and as the first container is withdrawn from a harvested tree, a new container is formed around a third tree, so that the harvesting system operates continuously along the row of trees.

BACKGROUND OF THE INVENTION

The invention relates to the field of tree fruit cultivating and harvesting, and in particular is a system for mechanizing the various operations required in growing and harvesting tree fruit to the greatest extent possible, thus avoiding the known disadvantages of manual labor, such as high cost, unreliability, and unpredictable variations in skill.

Heretofore, the various operations necessary in growing and harvesting tree fruit, such as pruning, fertilizing, spraying with insecticides, and harvesting have been performed either manually, or with various different mechanical devices each suited to the particular operation. For instance, spraying of insecticides and fertilizer is usually accomplished by towing a rather large spraying system between the rows of trees; the spraying system is seldom adapted for any purpose other than spraying, and so is useful for only brief periods during the year.

Pruning and trimming is still basically a manual operation, but the workers may be equipped with power driven pruning shears, and elevatable platforms which move on some sort of powered vehicle between the rows of trees are in limited use. These latter platforms may also be used in the harvesting operation to lift pickers to the appropriate places on the trees, but the actual picking is still done manually. The primary disadvantage of most forms of these platforms is that they will accommodate only one worker each, and are therefore quite costly per unit of production.

Various systems for mechanically harvesting tree fruit have been proposed, and some systems have been built and used in the field. The most common of these is a mechanism by which the tree is physcially shaken, causing the fruit to be broken away from the branches and to fall to the ground. This method has the disadvantages of requiring manual labor to retrieve the fruit from the ground, and of causing the fruit to be bruised as it strikes branches of the tree during its fall, thus decreasing its market value. To avoid these disadvantages, various catching frames have been proposed for placement under the tree to channel the fruit to a central collection point. These frames are equipped with some sort of a shock absorbing surface, but nevertheless do not completely eliminate bruising as the fruit falls onto the frame, and do nothing to prevent the bruising that occurs as the fruit strikes branches of the tree during its fall. In addition, the catching frames are quite cumbersome and, together with the mechanical shakers, require substantial space between the rows of trees to move from tree to tree.

SUMMARY OF THE INVENTION

This invention comprises a single tree fruit cultivating and harvesting machine to which various attachments may be made to perform the various operations required in an orchard at different times of the year. Manual labor is to the greatest extent possible excluded, so the problems of unreliability and high cost are substantially avoided. The system is self propelled, and is designed so as to straddle a row of trees, rather than to move along a road between the row of trees. Thus, it is seen that a great advantage of the invention is that substantial spacing between the rows of trees is not required, and that a given orchard area can support approximately twice the number of trees, and thus twice the yield, as was possible with prior devices and harvesting methods.

The basic device is equipped for pruning by installing top and side sickle bars, or rotary cutters, to shape the trees to the proper form for later harvesting operations and for maximum fruit production. In addition, platforms may be attached to the device to allow manual pruning of the interior branches of the tree.

The device is converted to a sprayer by the installation of an appropriate spray tank, spray nozzles and distributors. The insecticide, fungicide or fertilizer being sprayed may be directed both onto the row of trees which the device straddles and onto the rows on either side of the device. In spraying an orchard, therefore, the system is only required to pass over every other row of trees, thus further increasing its efficiency.

The harvesting attachment to the machine comprises a traveling partition system whereby as the machine advances along the tree row, individual trees are enclosed in containers the walls of which are formed by the partitions, and the bottoms of which are formed by a split lower deck of the machine. A cushioning material, such as shredded Styrofoam or foam rubber, is blown into the container formed around a tree, completely surrounding all parts of the tree and the fruit thereon. A shaker is attached to the tree, and as the fruit is shaken from the branches the fruit remains suspended and protected in the surrounding cushioning material. As the machine advances along the row, a cushioning withdrawal station moves into communication with the container, and by means of a fan and duct system pneumatically withdraws the cushioning from the container. Using the same fan and duct system, the cushioning is then conveyed to the next advancing container which has in the meantime been formed around the next tree in the row. As the cushioning is withdrawn from the first container, the fruit interspersed within the material is lowered gently to the bottom of the container without incurring bruise producing shocks, and two conveyor belts carry it to the rear of the machine where it may be deposited in appropriate receptacles.

In all of the above discussed operations, the machine moves continuously along the row of trees, speeding the operation and increasing the availability of the machine for operations on a greater number of trees.

It is thus seen that the invention provides several advantages over the machines and systems of the prior art. The disadvantages of manual labor are largely eliminated, but without sacrificing quality and marketability in the harvested fruit. A single system is provided for performing a multiplicity of operations in the orchard, thus reducing the grower's investment in equipment. The system operates continuously along a row of trees, thus saving the time taken by prior devices in transferring from tree to tree and allowing operation on more trees per unit time. Perhaps most importantly, a grower using the invention may plant about twice as many trees on a given acreage than was previously possible, thus doubling his yield per acre.

BRIEF DESCRIPTION OF THE DRAWINGS

The foregoing and additional objects, features and advantages of the invention will be apparent from the following detailed description of a preferred embodiment thereof, selected for purposes of illustration, and shown in the accompanying drawings, in which:

FIG. 4 is a plan view of the invention, taken in section along line 4—4 of FIG. 3.

FIG. 5 is a perspective cut-away view of the cushioning withdrawal station, generally along line 5—5 of FIG. 4.

FIG. 6 is a detail of the upper partition extender guide track taken along line 6—6 of FIG. 4.

FIG. 7 is a sectional elevation detail of the partition extender system taken along line 7—7 of FIG. 4.

FIG. 8 is a detailed showing of the connection between the drive chain and the partition extender scissors.

Like parts of the embodiment are designated by the same number in all of the drawings and in the specification.

DESCRIPTION OF A PREFERRED EMBODIMENT OF THE INVENTION

Figure 1:
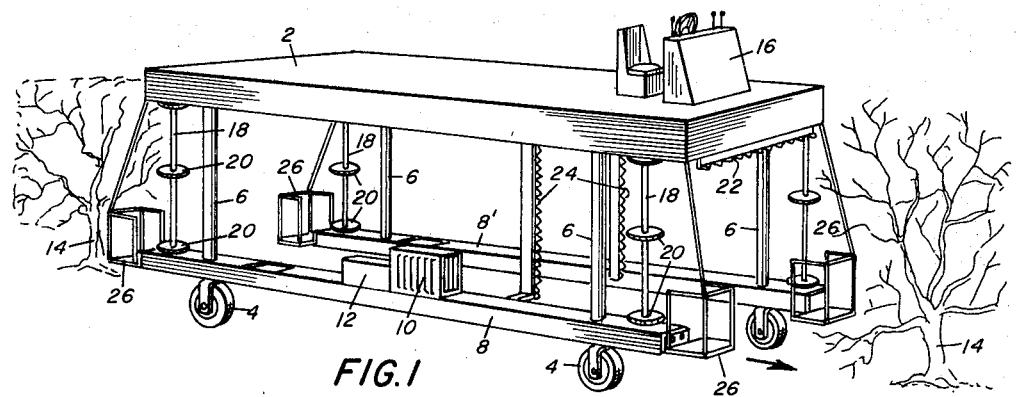
FIG. 1 is a perspective view of the invention equipped for trimming and pruning fruit trees.

As may be seen in FIG. 1, the basic frame of the tree fruit cultivating-harvesting machine consists of an upper horizontal deck portion 2 movably supported from the ground by wheels 4 on stilt-like columns 6. The columns 6 are joined along each side of the machine by horizontal rigid members 8, which members 8 also serve to support an engine 10 and accessories 12 for providing power to all of the various moving systems, to be discussed below, and are powered by engine 10 through suitable drive means under the control of the operator.

The machine as shown in FIG. 1 is equipped with attachments for trimming and pruning fruit trees. Sickle bars 22, 24 trim the top and sides, respectively, of the trees so that the trees are held to a proper shape for maintenance by the cultivating and harvesting machine. As some trees will produce substantial growth beyond the level of trimming during the growing season, the sickle bars 22, 24 may be extended a substantial distance inwardly of the actual interior contours of the machine, so that after the growing season, the trees will not have grown to be too large for harvesting by the machine. Rotary cutters may be provided in place of sickle bars 22, 24 and cutters may also be provided at the bottom of the machine for mowing the orchard grass.

In addition to the sickle bars 22, 24, platforms 26, on which individual workers may stand to reach into and prune branches from the interior of the trees, are installed at each corner of the machine. Additional platforms may be provided at each corner near the upper deck 2 of the machine, so that more workers will be available for faster pruning of the trees. In addition, because of the closer tree row spacing allowed with this form of cultivating and harvesting machine, the manual pruners may work upon the tree rows to either side of the machine, as well as the row which the machine straddles. Each worker may be equipped with a powered pruning cutter, which may be driven by power take-off means driven by the engine 10 and power accessories 12.

Figure 2:
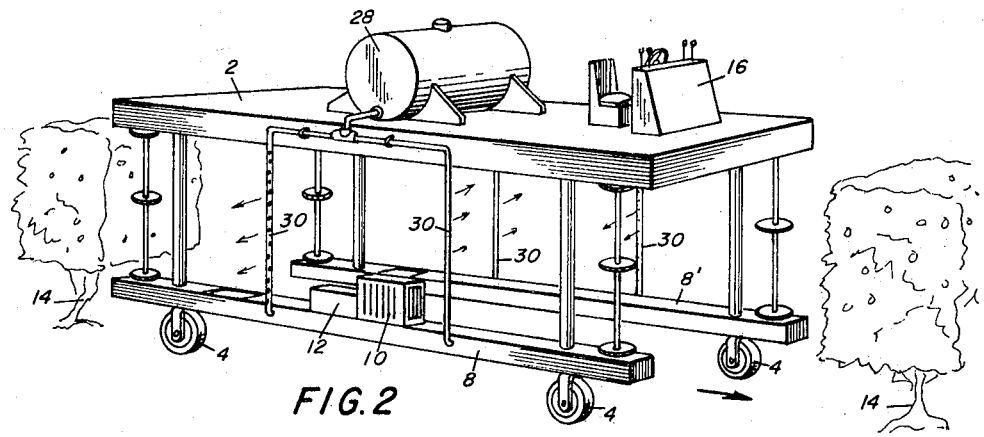
FIG. 2 is a perspective view of the invention equipped with a system for spraying fruit trees.

FIG. 2 shows the cultivating and harvesting machine equipped as a sprayer for distributing fungicides, insecticides, herbicides, or fertilizer onto the tree rows. In the embodiment shown, a tank 28 contains the liquid to be sprayed, which is forced through the spray headers 30 either by high pressure in the tank 28, or by providing a pump in the line 32 leading to the spray headers 30. Alternatively, the tank or tanks 28 may be located on the lower cross members 8 of the machine, so as to provide the machine with a lower center of gravity and increased stability. An "air carrier" system of spray distribution may be provided by leaving the fan and duct system, which is part of the harvesting system to be discussed below, attached to the machine, and distributing the liquid to be sprayed into the air currents generated by these fans. Either system directs the spray directly toward the trees, so that a minimum amount of the liquid being sprayed is wasted on the ground. In addition, the highly directional characteristic of the spray allows spraying operations to be conducted on windy days, which is not possible with most present systems.

Figure 3:
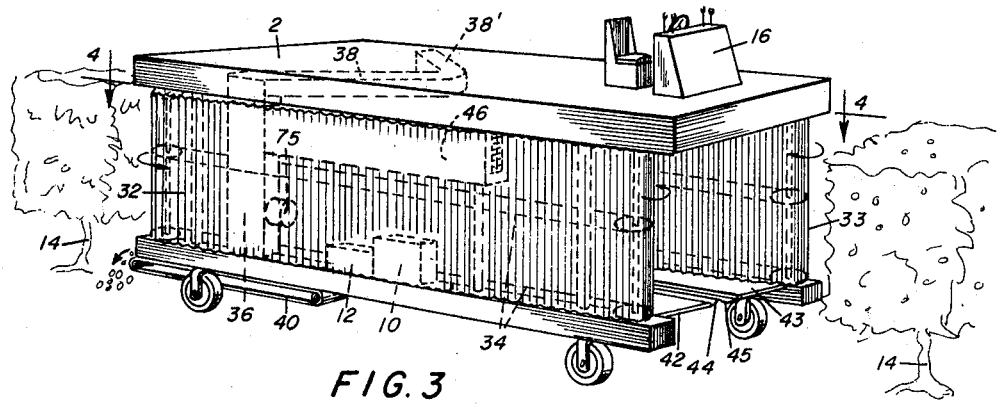
FIG. 3 is a perspective view of the invention equipped with automatic tree fruit harvesting system.

FIG. 3 illustrates the apparatus equipped for use in harvesting fruit from the trees. Vertical belts of flexible, pleated partitioning 32 and 33 are provided, one on each side of the machine. Each belt of the partitioning is driven by chain drives such as that illustrated at 34 on belt 32, the chains being mounted on powered shafts 18 and sprocket wheel 20. The linear speed of the partitioning, which moves with respect to the machine, is adjusted so that when the machine is moving, the speed of that portion of the partitioning which is on the interior of the machine is zero with respect to the ground, and thus with respect to any trees enclosed therein. Thus, on the interior of the machine the partitioning may be extended to form containers about the trees over which the machine passes. The containers so formed may be filled with cushioning material, and the tree enclosed therein shaken to remove the fruit therefrom. The cushioning may then be withdrawn from the containers through the bottom of a vertical duct 36 and pneumatically conveyed through a horizontal duct 38 to the next advancing container formed by the partition system. As the cushioning is withdrawn from a container, the fruit suspended therein is deposited upon conveyors 40, 41 located at each side of the machine and the fruit is carried off the machine to an appropriate receptacle. Split lower deck portions 42, 43 provide a bottom for the containers formed by the extended partitioning. The slot formed between the deck portions 42, 43 is provided to allow tree trunks to pass through the machine. The slot is sealed by two flexible flaps 44, 45, which may be of rubber or some other suitable material. When the machine is not in active harvesting operation, the cushioning is stored in chambers 46.

FIG. 4 illustrates more clearly how the containers are formed about each individual tree as the harvesting machine advances along the tree row. The flexible partitioning belt 32 is attached to the chains 34 at spaced points 47, 48, 49, corresponding to the spacing between the trees. At points 57, 58 along the partition, mid-way between the chain supported points 47, 48 and 48, 49, the partitioning is rollably supported in an overhead track 50, as is more clearly illustrated in FIG. 6, which is a sectional view 6—6 at point 58. The guide track 50 is in the shape of a hollow channel which may be supported from upper decking 2, and a rotatable wheel 52 is attached by means of pin 54 to vertical bracket 56, to which is attached the flexible partitioning 32. The bracket 56 extends down the entire height of the partition and terminates at a lower track and roller arrangement at the bottom of partitioning 32 similar to the upper track arrangement shown.

Returning to FIG. 4, it is seen that as the partitioning advances along the interior of the machine, the guide rail 50 is so formed as to cause the rollably supported points 57, 58 of the partitioning to be extended to the center line of the machine, there meeting the corresponding extended partition 33, supported at the other side of the machine at points 47', 48', 49', by chains 34 and at 57', 58' from track 51 to form a generally cylindrical container surrounding the tree on the interior of the machine. Referring to FIG. 7, which is a view at 7—7 of FIG. 4, it will be seen that extensible support scissors 60 extend between the middle chain 34 and the vertical bracket 56 to provide additional support for the flexible partitioning 32, and to connect the bracket 56 and rollers 52 with the driving force provided by center chain 34.

In similar manner, point 58 is supported by scissors 61, point 57' of curtain 33 is supported by scissors 60' and point 58' is supported by scissors 61'.

A detail of the arrangement of FIG. 7 whereby the extension scissors 60 are attached to drive chain 34 is shown in FIG. 8. A rigid member 59 is provided with vertical slots 63 in which the ends of scissors 60 are slidably mounted. As the partitioning is extended position shown in FIGS. 4, 7 and 8. Horizontal telescoping bracket 65 is rigidly mounted to remain perpendicular to chain 34 through member 61, and assists in holding scissors 60 rigid so that the driving force of chain 34 is transmitted to the extended partition.

Again referring to FIG. 4, it is seen that as the interior of the flexible partitioning advances to the rear of the machine, the track 50 is so shaped as to cause the partitioning to be withdrawn from its extended position, thus opening the back of the machine to allow the trees to pass out of the end of the machine after harvesting.

Lower deck plates 42, 43, which are carried by the machine, provide a bottom surface for the tree containers formed by the extended partitioning 32, 33. The plates 42, 43 are separated by a slot running the entire length of the machine, the slot being sealed by flexible flaps 44, 45 to allow the passable of the tree trunks therethrough as the machine moves down a row of trees. Near the rear of the machine, to the left, as viewed in the figures, the lower deck plates 42 are provided with semi-circular cut-outs 62, 62' to allow cushioning material to fall out of the containers formed by the extended partitioning 32, 33, as the containers move rearwardly with respect to the harvesting machine. The cushioning is retrived by suction through the bottom of vertical ducts 36, 36' and is pneumatically conveyed through ducts 38, 38' to the next advancing container. As the cushioning is withdrawn through ducts 36, 36', the fruit suspended in the cushioning also passes downwardly through semicircular cut-outs 62, 62' to conveyors 40, 41, which move the fruit to the rearward end of the machine for deposition in appropriate receptacles. To allow more time for withdrawal of the cushioning from the container, cut-outs 62 may be extended along the length of the machine into a generally elliptical shape, rather than circular as shown.

Telescoping shakers 64 are provided on the underside of the machine (FIGS. 4 and 9) for grasping the trunks of the fruit trees and vibrating then to detach the fruit from the branches. The shakers may be equipped with extended feeler whiskers and servomotor controls to automatically attach the shaker to the appropriate tree trunk, or they may be attached to the tree trunk by any other suitable, known method. Shakers 64 are mounted on a swivel connection to the frame of the machine, so that they may remain attached to a particular tree for a sufficient period of time to complete the shaping operations as the harvesting machine continuously advances along the tree row.

Figure 10:
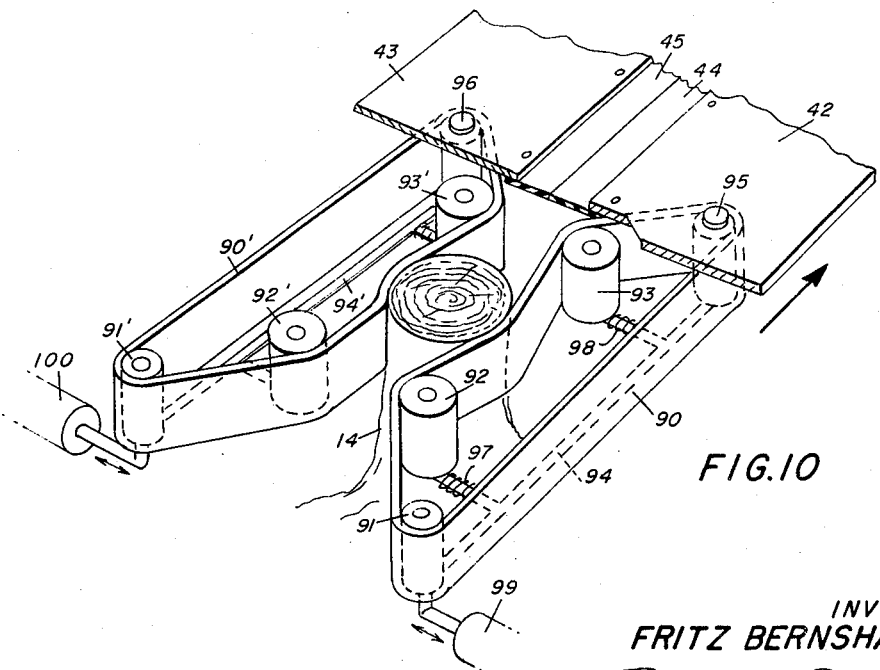
FIG. 10. is a perspective view of an alternative form of tree shaker.

An alternative form of tree shaker is shown in FIG. 10. Two belts, 90, 90' are mounted beneath the lower deck 42, 43 of the machine so that a tree trunk may pass between them. Rollers 91, 92, 93 and 91', 92', 93' on which the respective belts turn, are mounted on respective frames 94, 94' and are pivoted to the lower deck plates 42, 43 at connection points 95, 96, respectively. The forward sets of rollers 92, 93 on frame 94 are yieldably mounted to the frame by means of heavy springs, illustrated diagrammatically at 97, 98 so that they may be forced backward a sufficient distance to allow a tree trunk to pass into the space between the belts. The rollers 92' and 93' on frame 94' are similarly mounted. Hydraulic rams 99 and 100, mounted to the frame of the harvesting machine oscillate in unison to impart a shaking movement to the belts 90 and to the tree trunk passing therebetween. This form of shaker has the advantages that no external centering controls are required, and the length of shaking time may be altered merely by changing the length of the belts 90, 90' and the spacing of the corresponding rollers 91, 92 and 91', 92'.

The cushioning material withdrawal station is shown more clearly in FIG. 5. As illustrated in this perspective view, vertical duct 36' is mounted on main side member 8' adjacent the opening 62, 62' in deck plates 42, 43. Note that flexible sealing flaps 44, 45 continue across the opening 62, 62' to close off the space formed between conveyors 40, 41; the flaps and the conveyors thus form a bottom for the containers at this point, in place of the deck plates 42, 43. As the circular opening 62, 62' moves under each container in turn, the cushioning and the fruit falls down onto the conveyors 40, 41. A fan located in vertical duct 36' pulls air through opening 66 and this moving air entrains the cushioning material and causes it to be conveyed upwardly through duct 36'. A similar fan arrangement is provided in duct 36. The fruit, being heavier than the pieces of cushioning, is not entrained in the air stream, but is deposited upon conveyors 40, 41 running along each side of the machine. Bars 68 are provided over opening 66 to prevent any fruit from rolling into duct 36. In addition, the conveyor belts may have a loose pile surface or the like to prevent the fruit from being rolled off the sides of the conveyors as the system progresses along the tree row. The flexible flaps 44, 45 extending across the semicircular cut-out 62, 62' insure that any fruit settling out of the container in the center of the harvesting machine will be deflected to the side to be collected by one of the conveyors 40, 41.

Lower guide tracks similar to the guide tracks 50, 51 shown in FIG. 6 preferably are provided to guide the lower edge of the extended partition bracket generally along the paths indicated by lines 70 and 71.

To assist in removing the cushioning from the containers, high pressure air manifolds 72 may be provided with air nozzles 73 directed toward opening 66 in duct 36', and toward the corresponding opening in duct 36, to impinge upon the descending cushioning and move it towards the collecting opening 66. High pressure air is supplied to these nozzle either from a precharged high pressure air tank, or from a compressor driven by engine 10. Vertical duct 36, with a corresponding opening 66, is located at the opposite side of the machine at the cushioning withdrawal station, as was shown in FIG. 4.

Figure 9:
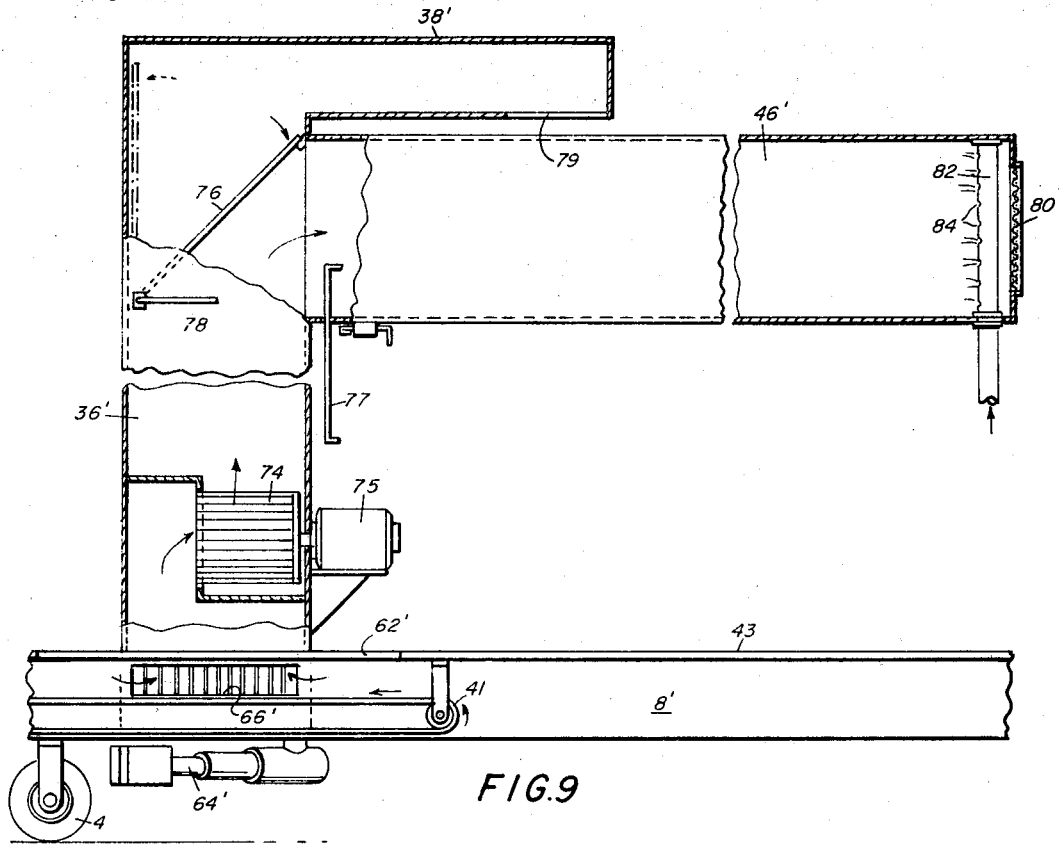
FIG. 9 is a sectional elevation showing the cushioning withdrawal station and conveying and storage system.

The cushioning withdrawal and conveying system is shown in more detail in FIG. 9. Fan 74, mounted in duct 36' and driven by motor 75, draws the cushioning through opening 66 and up duct 36'. A swinging damper 76 installed in duct 36' is positioned by manual actuator 78. A sliding gate 77 is provided at the opening of chamber 46. When the machine is in harvesting operation, damper 76 is in a vertical position, gate 77 closes the opening of chamber 46, and cushioning advances up duct 36' and out duct 38' to be deposited in the appropriate advancing container through opening 79. If for any reason it is desired to stop harvesting operations, such as when the machine reaches the end of a row, damper 76 is pivoted to a diagonal position blocking communication to duct 38' from duct 36', and gate 77 is opened to allow communication between duct 36 and storage chamber 46. Cushioning is blown into storage chamber 46 and is collected there while the air stream passes out through screened opening 80 at the end of storage chamber 46. A high pressure air manifold 82 is installed in the end of storage chamber 46 with nozzles 84 pointed in the direction of vertical duct 36'. When it is desired to resume harvesting operations, damper 76 is moved once again to its vertical position, fan 74 is started, gate 77 is opened, and high pressure air is blown through nozzles 84 to force the cushioning out of storage chamber 46 and into vertical duct 36', where it again passes through duct 38' and out through opening 79. When chamber 46 is empty, the air supply to nozzles 84 is cutoff gate 77 is closed and the system resumes normal operation. The process of removing the cushioning from storage chamber 46 may be speeded by sealing screened opening 80 with an appropriate plate or damper. Alternatively, a bypass duct and damper arrangement may be added to cause the air from fan 74 to flow through opening 80 and storage chamber 46 before it enters duct 36', thereby allowing omission of high pressure air manifold 82. High pressure air is supplied to manifold 82 from the same source that supplies air manifolds 72.

Reviewing the harvesting operation, it is seen that as the machine continuously advances along a tree row, the rollably supported points 57, 58 of the partitioning 32 are extended by tracks 50, 51 and 70, 71 to form generally cylindrical containers about trees on the interior of the harvesting machine. As the machine advances, a given container is filled with cushioning material, a tree shaker engages the trunk of the tree and dislodges the fruit therefrom, and the cushioning material surrounding the tree and the fruit prevents the fruit from falling and being bruised by impact with branches of the tree or with a collecting frame. The partitions 32 are driven along the interior of the machine by a chain drive, and their speed is adjusted so that they are stationary with respect to the trees on the interior of the machine. As the machine advances, a cushioning withdrawal station moves into communication with the container, where the cushioning is withdrawn from the container by a pneumatic conveying system. The cushioning moves through an opening 66, up ducts 36, 36', and out ducts 38, 38' to be deposited in the container surrounding the next three in the direction in which the machine is advancing. As the cushioning material is wthdrawn, the frut is gently deposited upon conveyors 40, 41 and collected in appropriate receptacles. When the cushioning withdrawal operation is complete, the partitions 32 are withdrawn from around the tree to allow the tree to pass off the rear of the machine and, as the partitions 32 are formed in two continuous belts, one at each side of the machine, a new container is formed at the front of the machine about a new tree moving into the interior of the machine. When it is desired to cease harvesting operations, the cushioning material is stored in storage chambers 46.

The major advantages of the system are that tree rows may be spaced substantially closer together than is possible with prior devices, thus allowing more fruit production per acre, and that multiple operations may be accomplished with one basic system, thus reducing capital outlay required for orchard equipment. Substantially less manual labor is required than with prior devices and methods, and the fruit is harvested without subject it to sharp impacts which cause brusing and reduce the marketability of the crop.

This constitutes a general description of but one embodiment of the inventiton, and modifications will be obvious to those skilled in the art.

I claim:
1. A method for continuously harvesting fruit from a row of trees, comprising the steps of:
    surrounding a tree in said row with a container;
    filling said container with cushioning material;
    detaching the fruit from said tree;
    withdrawing said cushioning material from said container at a withdrawal station; and
    moving said withdrawal statiotn continuously along said row of trees.
2. The method of continuously harvesting fruit from a row of trees as described in claim 1, wherein the step of surrounding said tree with said container comprises:
    moving a frame along each side of said tree;
    mounting a flexible, vertical face, horizontally traveling, belt on each of said frames;
    adjusting the linear speed of said belts so that the side of said belts adjacent to said tree is stationary with respect to said tree; and
    extending selected, corresponding, points of each of said belts to meet on either side of said tree.
3. The method for continuously harvesting fruit from a row of trees as described in claim 2, further including the steps of:
    surrounding a second tree in said row with a second container; and
    transferring said cushioning material from said first container to said second container.
4. The method of continuously harvesting fruit from a row of trees as described in claim 3, further including the steps of:
    withdrawing said selected points of said belts from the extended position about said first tree; and
    concurrently extending other selected points of said belts to form a container about a third tree.
5. The method for continuously harvesting fruit from a row of trees as described in claim 4, further including the steps of:
    separating said fruit from said cushioning material; and
    conveying said fruit to a collection point.
6. The method for continuously harvesting fruit from a row of trees as described in claim 5, wherein
    the step of detaching said fruit from said tree comprises mechanically shaking said tree.

References Cited
UNITED STATES PATENTS 3,269,099   8/1966   Fricks _____ 56—1
3,370,409   2/1968   Stong _____ 56—328

LOUIS G. MANCENE, Primary Examiner

J. A. OLIFF, Assistant Examiner

U.S. Cl. X.R.

56—328